(No Model.)
W. H. CASTLE.
ANIMAL TRAP.
No. 507,417. Patented Oct. 24, 1893.
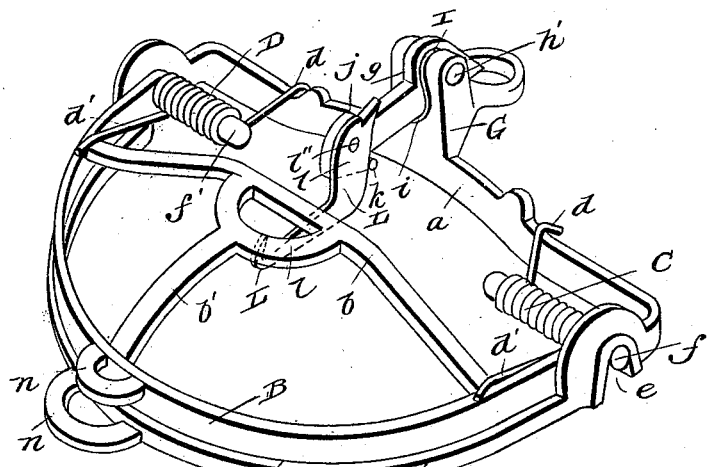
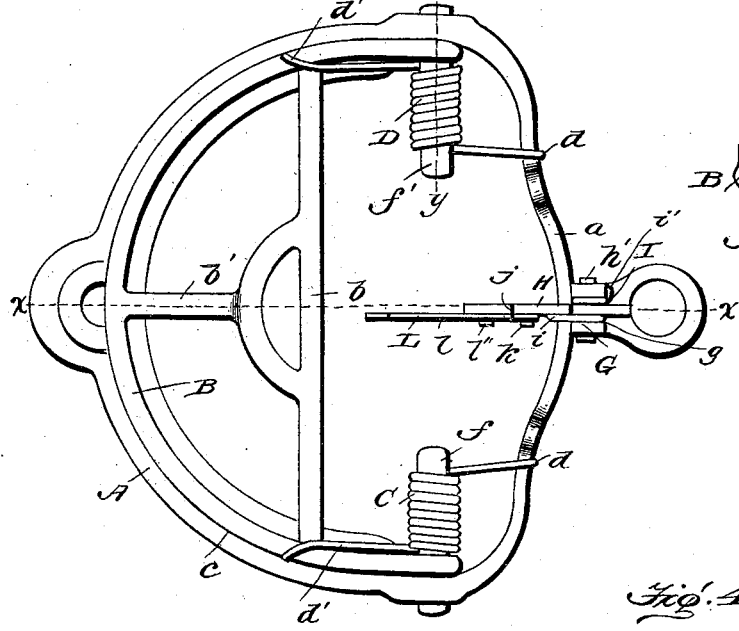
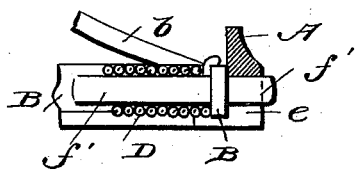
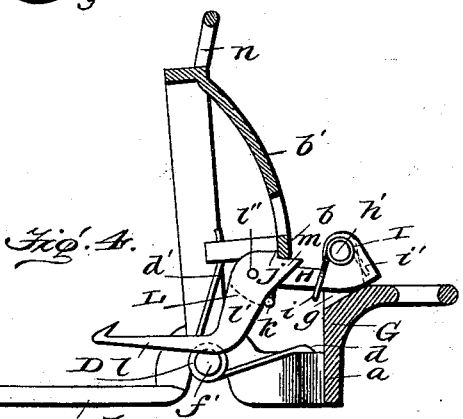
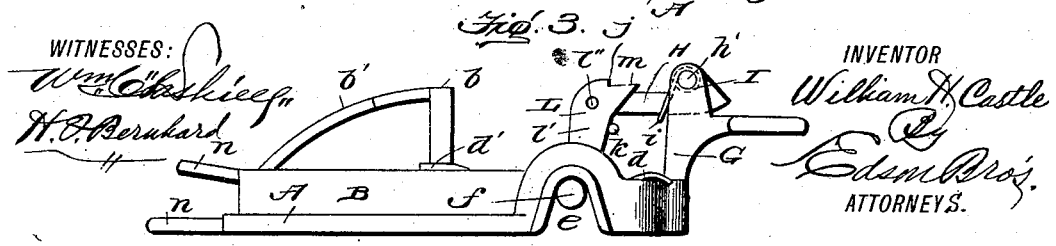
WITNESSES:
INVENTOR
William H. Castle
By
Edson Bros.
ATTORNEYS.

UNITED STATES PATENT OFFICE.

WILLIAM H. CASTLE, OF NORTH EAST, PENNSYLVANIA.

ANIMAL-TRAP.

SPECIFICATION forming part of Letters Patent No. 507,417, dated October 24, 1893.

Application filed January 18, 1893. Serial No. 458,800. (No model.)

*To all whom it may concern:*

Be it known that I, WILLIAM H. CASTLE, a citizen of the United States, residing at North East, in the county of Erie and State of Pennsylvania, have invented certain new and useful Improvements in Animal-Traps; and I do hereby declare the following to be a full, clear, and exact description of the invention, such as will enable others skilled in the art to which it appertains to make and use the same.

My invention relates to improvements in animal traps, and one of the objects is to provide an improved bait and tripping mechanism which shall be very sensitive to touch and operate to throw or close the jaws of the trap on a very slight pull on the bait, while at the same time the movable jaw will be caught and retained by such mechanism by simply pulling the jaws apart, thus effecting the automatic setting of the trap which can be easily effected in the dark or by a blind person.

A further object of the invention is to simplify and cheapen the construction of the trap and enable the same to be quickly put together as the jaws are so constructed and the pivots and springs so arranged that the tension of the springs on the pivots serves to hold the movable jaw on the base or stationary jaw of the trap.

With these and other ends in view, the invention consists in the combination with the jaws of a trap, of a trigger and bait hook connected together and forming a compound lever movement and adapted to engage with the movable jaw and to release the latter automatically by a very slight pull or touch on the bait confined on said bait hook. The trigger is pivoted at one end to the base or lower jaw of the trap, and at its free end it has two shoulders, one of which serves as a stop to limit the depression of the bait-hook and the other of which is normally held, by a spring pressing against the heel of the trigger, in the path of the movable jaw so that when the latter is raised it will take against the shoulder on the trigger. The bait hook is made in the form of a bent lever of the style commonly known as "bell crank" levers, and the inner upper part of the vertical arm of said bait-hook is pivoted or fulcrumed to the forward end of the trigger in advance of the upper shoulder thereof. This bait-hook projects forward beyond the trigger, and it drops by gravity so that it rests or bears against the stop-shoulder on the trigger. The heel of this bait-hook is prolonged or extended to form the tongue that bears against the movable jaw when the latter is raised to engage with the trigger, and when the bait is touched or pulled on the free end of the bait-hook this tongue is pressed against the movable jaw to release the latter from the shoulder on the trigger and permit the springs to force the two jaws together.

The invention further consists of a base or lower jaw provided with slots open at their lower sides and closed on their upper sides, an upper movable jaw provided at its rear end with rigid trunnions which are fitted in the open slot-bearings of the base, and coiled tension springs fitted around the inner ends of the trunnions and having oppositely extending arms which bear, respectively, upon the base and the movable jaw and which serve to hold the trunnions of the movable jaw against the upper closed sides of the slots in the base.

The invention further consists in the peculiar construction and arrangement of parts, and in the novel combination of devices, as will be hereinafter fully described and pointed out in the claims.

I have fully illustrated my invention in the accompanying drawings, forming a part of this specification, and in which—

Figure 1 is a perspective view of my improved animal trap showing the jaws closed. Fig. 2 is a top plan view thereof. Fig. 3 is a side elevation. Fig. 4 is a vertical sectional view, on the plane indicated by the dotted line $xx$ of Fig. 2, showing the jaws opened and the movable jaw engaged with trigger and bait hook. Fig. 5 is a detail transverse sectional view on the line $y\,y$ of Fig. 2.

Like letters of reference denote corresponding parts in all the figures of the drawings, referring to which—

A designates the base or lower stationary jaw of the trap, and B is the upper movable jaw, which jaws are pivotally connected together in a peculiar manner and are held together and closed by the tension of the springs C, D.

The jaws A, B, are each cast in a single piece of metal, and the lower jaw is made of semi-circular shape with a transverse connecting bar $a$ which joins the ends of the semi-circular part thereof. The movable upper jaw B is also made semi-circular to conform to the shape of and fit snugly upon the lower jaw or base A, and said upper jaw B is provided with an arched cross bar $b$ and with a connecting web $b'$, said arched bar and web, $b$, $b'$, forming a guard at the rear side of the movable jaw which guard operates to prevent an animal, when the trap is set, from taking the bait off the bait hook from the rear side of the trap. The upper side of the base or lower jaw A is provided with a groove or channel $c$ to receive the lower edge of the movable jaw when the latter is closed upon the base or lower jaw, and said base is further provided, at its sides, with the raised integral lugs having the vertical bearing slots $e$, $e$, formed therein, the lower ends of said vertical bearing-slots being open while the upper ends of the slots are closed by the lugs, as clearly shown in Figs 3 and 5.

The movable jaw B of the trap is provided at its rear ends with the trunnions $f$, $f'$, which are rigid with the jaw, being preferably cast integral therewith. These trunnions are arranged in line with each other, and each trunnion projects at its ends from opposite sides of the jaw, whereby the outer ends of the trunnions are adapted to fit in the bearing-slots of the base while the inner ends of the trunnions serve as the supports for the coiled tension springs C, D. The coiled parts of these springs are fitted around the inner ends of the trunnions, $f$, $f'$, and each spring has two oppositely extending arms, $d$, $d'$, one of said arms bearing upon the rear cross bar of the base A and the other arm bearing upon the arched bar of the upper movable jaw. By this construction and arrangement of parts, the jaws can be readily fitted together and the springs easily placed on the trunnions, and the tension of the springs serves to force the trunnions against the upper closed sides of the bearing slots, to hold the upper jaw in place on the base, while permitting it to have the necessary movement to open and close the jaws, and at the same time the tension of the springs serves to close the upper jaw upon the base when the bait-hook operates to release the upper jaw from the trigger.

The rear cross bar of the base or lower jaw A is provided with a central post G which rises vertically from the bar and which has its upper end slotted or bifurcated, at $g$, to receive the heel or rear end of the trigger H. This trigger is arranged in a horizontal position so as to project forwardly beyond the post, and its heel is enlarged and fitted in the slotted part of the post, said trigger being pivoted on a pin or shaft $h'$ which passes through the post and the heel of the trigger. Around this pin or shaft is fitted the coiled part of a lifting spring I, which has one arm, $i$, bent to fit under the trigger in advance of its pivot and the other arm $i'$ of the spring is bent to press against the fixed post G, as shown by Fig. 4.

The forward, free end of the trigger is provided with two shoulders, $j$, $k$, one of which is formed on the upper edge of the trigger while the other is located on the lower side of the trigger and extends or projects laterally or to one side of the same. This upper shoulder is adapted to engage with the arched bar $b$ of the upper jaw when the latter is elevated, as the spring I serves to hold the trigger in such position that the shoulder $j$ is in the path of the cross bar $b$ of said jaw B, while the other lower shoulder $k$ serves as the stop to arrest the descent of the gravity bait-hook L. This bait hook L is made in the form of a bell-crank lever, and its horizontal arm $l$ projects forwardly beyond the free end of the trigger while the vertical arm $l'$ is pivoted at its upper end, as at $l''$, to the trigger in advance of the upper shoulder $j$ thereof. The heel of this bait-hook is adapted to rest or bear against the shoulder $k$ when the jaws are closed, or the upper jaw is free from contact with the trigger, and said heel of the bait-hook is prolonged to provide the tongue $m$ which lies alongside of the shoulder $j$ and extends in rear thereof.

The operation of my improved animal trap is as follows: To set the trap, the forked or hooked end of the bait-hook receives the bait, and the jaws are then pulled or forced apart, suitable lugs $n$, $n$, being provided on the base and movable jaw to afford proper holds for the fingers in adjusting the trap. As the jaw B is raised, it puts the springs C, D, under tension, and when the rear arched bar $b$ of said jaw B rides upon the trigger, the latter is depressed sufficiently for the jaw to move thereon until the bar $b$ passes the shoulder $j$, when the spring I lifts the trigger so that the shoulder $j$ takes in front of the bar $b$ of the jaw, thus locking the jaws in their opened positions. As the bar $b$ of the jaw B rides upon the free end of the trigger, the tongue $m$ of the bait-hook is depressed and lies below and in contact with said bar $b$, while the free end of the bait hook is thus lifted somewhat above its normal position. As the guard on the upper jaw prevents an animal from taking the bait off the hook from the rear side of the trap, the animal is compelled to thrust its head between the open jaws in order to have access to the bait on the hook L, and the slightest pull, or even a touch, on the bait will serve to depress the hook L so as to throw the shoulder $m$ against the rear bar with sufficient force to lower the free end of the trigger and cause the shoulder $j$ to free itself from the bar $b$, whereupon the springs force the jaw B upon the base A.

It will be observed that the trap will be set simply by pulling the jaws apart, which is very desirable as the trap can be set in the dark and without any liability of the jaws being closed together upon the hands of the operator.

I am aware that changes in the form and proportion of parts and details of construction of the mechanism herein shown and described as an embodiment of my invention can be made without departing from the spirit or sacrificing the advantages of the same, and I therefore reserve the right to make such alterations as fairly fall within the scope of my invention.

Having thus fully described my invention, what I claim as new, and desire to secure by Letters Patent, is—

1. The combination with a base and spring controlled jaw, of a spring pressed trigger having its free end held in the path of said jaw, and a bait-hook pivoted to the trigger and adapted to release the same from the jaw, substantially as and for the purpose described.

2. The combination with a base and a jaw, of a yielding trigger having its free end sustained by a spring in the path of said jaw and adapted to engage therewith, and a bait-hook carried by said trigger and arranged to bear against the jaw and free the trigger from said jaw, substantially as and for the purpose described.

3. The combination with a base and a jaw, of a pivoted trigger having the shoulder $j$ adapted to engage with the jaw, a spring for normally holding the shouldered end of the trigger in the path of said jaw, and a bait-hook having an angular arm pivoted to the trigger and provided with a tongue adapted to press against the jaw, for the purpose described, substantially as set forth.

4. The combination with a base and a jaw, of a spring pressed trigger pivoted on the base and provided with the shoulder $j$ and with the laterally extending shoulder $k$, a bait hook pivoted to the trigger in advance of its shoulders, to rest by gravity against the shoulder $k$, and provided with a tongue which bears against the jaw, and the spring for pressing the movable jaw upon the base, substantially as and for the purpose described.

5. An animal trap consisting of a base having the bearings, a movable jaw provided with the extended trunnions fitting in the bearings of said base, the springs fitted on the trunnions and each having arms which bear, respectively, on the base and the jaw, and a bait and tripping mechanism, substantially as and for the purpose described.

6. In an animal trap, the base having the vertical bearing slots, combined with a movable jaw having rigid trunnions which are extended on both sides of said jaw and the outer ends of said trunnions fitted in the bearing slots of the base, and the springs fitted on the inner ends of the trunnions and having the arms which bear against the base and jaw, whereby the springs exert their tension to hold the trunnions against the closed sides of the bearing-slots and also to close the movable jaw upon the base, substantially as and for the purpose described.

7. In an animal trap, the combination with a base and a bait and tripping mechanism mounted thereon, of a spring controlled jaw pivoted to the base on opposite sides of the bait and tripping mechanism and provided with the arched guard, for the purpose described, substantially as set forth.

In testimony whereof I affix my signature in presence of two witnesses.

WILLIAM H. CASTLE.

Witnesses:
H. L. MALICK,
L. G. FRENCH.